(12) United States Patent
Oshima et al.

(10) Patent No.: US 7,979,467 B2
(45) Date of Patent: Jul. 12, 2011

(54) INFORMATION PROCESSING DEVICE, INFORMATION MANAGEMENT DEVICE, INFORMATION PROCESSING SYSTEM AND COMPUTER READABLE MEDIUM

(75) Inventors: Akihide Oshima, Saitama (JP); Eiji Shimoichi, Saitama (JP); Yuriko Inakawa, Saitama (JP); Masaki Kurokawa, Saitama (JP); Eiji Nishi, Saitama (JP); Noriyuki Tatsuma, Saitama (JP); Akira Okamoto, Saitama (JP); Takanari Ishimura, Saitama (JP); Yoshiyuki Yoda, Saitama (JP); Atsuhiro Itoh, Saitama (JP); Fumio Harada, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 448 days.

(21) Appl. No.: 12/120,884

(22) Filed: May 15, 2008

(65) Prior Publication Data

US 2009/0094241 A1 Apr. 9, 2009

(30) Foreign Application Priority Data

Oct. 3, 2007 (JP) ................................ 2007-260313

(51) Int. Cl.
 *G06F 17/00* (2006.01)
 *G06F 17/30* (2006.01)
(52) U.S. Cl. .................. 707/782; 707/784; 707/999.009
(58) Field of Classification Search .................. 707/782, 707/784, 999.009; 709/219, 238; 713/182, 713/185
See application file for complete search history.

(56) References Cited

U.S. PATENT DOCUMENTS

| 5,163,091 A * | 11/1992 | Graziano et al. ............... 713/176 |
| 6,772,153 B1 * | 8/2004 | Bacon et al. ........................... 1/1 |
| 7,165,096 B2 * | 1/2007 | Soltis ............................ 709/217 |
| 2002/0152070 A1 | 10/2002 | Oda |
| 2007/0245108 A1 * | 10/2007 | Yasaki et al. ................... 711/163 |
| 2008/0256074 A1 * | 10/2008 | Lev et al. ........................... 707/8 |

FOREIGN PATENT DOCUMENTS

| JP | 10-232732 A | 9/1998 |
| JP | 2001-188759 A | 7/2001 |
| JP | 2002-312318 A | 10/2002 |
| JP | 2003-157412 A | 5/2003 |
| JP | 2003-167849 A | 6/2003 |
| JP | 2004-145896 A | 5/2004 |
| JP | 2004-226843 A | 8/2004 |
| JP | 2005-25427 A | 1/2005 |
| JP | 2005-293426 A | 10/2005 |
| JP | 2006-202011 A | 8/2006 |
| WO | 2007/052342 A1 | 5/2007 |

OTHER PUBLICATIONS

Notification of Reasons for Refusal issued in counterpart Japanese Application No. 2007-260313 dated Jan. 4, 2010.

* cited by examiner

*Primary Examiner* — Marc R Filipczyk
(74) *Attorney, Agent, or Firm* — Sughrue Mion, PLLC (57) ABSTRACT

An information processing device includes a lock section, a creation section, a transmission section, a reception section, and a release section. The lock section disables an authorization function of the information processing device under a given condition. The creation section creates a first lock release file that is capable of releasing the authorization function disabled by the lock section. The transmission section transmits the first lock release file to an information management device. The reception section receives a second lock release file, which is based on the first lock release file, from the information management device. The release section tries to enable the authorization function of the information processing device when the second lock release file is determined to be valid.

10 Claims, 12 Drawing Sheets

| MANAGEMENT APPARATUS ROUTE INFORMATION TABLE ||
|---|---|
| ADMINISTRATOR | administrator |
| NETWORK ADDRESS | 12: 34: 56: 78 |
| IP ADDRESS | 123, 123, 111, 123 |
| HOST NAME | admin |
| ROUTE INFORMATION 1 | |
|    TOTAL HOP COUNT | 3 |
|  NODE 1 | |
|    DOMAIN NAME<br>   IP ADDRESS<br>   NETWORK ADDRESS<br>   TTL | aaa. xyz. co. jp<br>123. 123. 111. 1<br>23: 45: 67: 89<br>23. 56ms |
|  NODE 2 | |
|    DOMAIN NAME<br>   IP ADDRESS<br>   NETWORK ADDRESS<br>   TTL | bbb. xyz. co. jp<br>123. 123. 222. 1<br>34: 56: 78: 9a<br>34. 67ms |
|  NODE 3 | |
|    DOMAIN NAME<br>   IP ADDRESS<br>   NETWORK ADDRESS<br>   TTL | ccc. uvw. co. jp<br>123. 234. 333. 1<br>45: 67: 89: ab<br>56. 89ms |
| ROUTE INFORMATION 2 | |
|    TOTAL HOP COUNT | 4 |
|  NODE 1 | |
|    DOMAIN NAME<br>   IP ADDRESS<br>   NETWORK ADDRESS<br>   TTL | aaa. xyz. co. jp<br>123. 123. 111. 1<br>23: 45: 67: 89<br>23. 56ms |
|  NODE 2<br>    : | |

CONSTITUTIONAL EXAMPLE OF FIRST LOCK RELEASE FILE

| | | |
|---|---|---|
| ADMINISTRATOR AUTHORIZATION | administrator | |
| DEVICE MAC ADDRESS | 12: 34: 56: 78: 90: 12 | |
| IP ADDRESS | 123. 123. 111. 123 | |
| HOST NAME | admin | |
| SERIAL NUMBER | 0025678123 | ~F3 |
| VALIDITY TERM | TEN MINUTES | |
| TRANSMISSION TIME | 20070310211520 | |
| RECEIVABLE TIME | 20070310213019 | |
| RELEASE HINT | ADMINISTRATOR'S MOBILE TELEPHONE NUMBER? | |

FIG. 12B

CONSTITUTIONAL EXAMPLE OF SECOND LOCK RELEASE FILE

| | | |
|---|---|---|
| ADMINISTRATOR AUTHORIZATION | administrator | |
| DEVICE MAC ADDRESS | 12: 34: 56: 78: 90: 12 | |
| IP ADDRESS | 123. 123. 111. 123 | |
| HOST NAME | admin | |
| SERIAL NUMBER | 0025678123 | ~F4 |
| VALIDITY TERM | TEN MINUTES | |
| TRANSMISSION TIME | 20070310211520 | |
| RECEIVABLE TIME | 20070310213019 | |
| REPLY TO RELEASE HINT | 090 − ∗∗∗ · · · · | |
| LOCK RELEASE CODE | 1A2C3E4G5 | |

INFORMATION PROCESSING DEVICE, INFORMATION MANAGEMENT DEVICE, INFORMATION PROCESSING SYSTEM AND COMPUTER READABLE MEDIUM

CROSS-REFERENCE TO RELATED APPLICATIONS

This application is based on and claims priority under 35 USC 119 from Japanese Patent Application No. 2007-260313 filed Oct. 3, 2007.

BACKGROUND

1. Technical Field

The present invention relates to an information processing device, an information management device, an information processing system, and a computer readable medium.

2. Related Art

Heretofore, acquiring information and setting of a device (information processing device or the like) connected to a network and having a web server function have been performed through a web browser by a remote operation.

In order to prevent setting by such the remote operation from being performed illegally, administrator's authentication is performed by means of a password or an ID code for better security.

In order to prevent an attack by any user other than the administrator, and particularly by unauthorized user, a system may lock functions (a system is shifted to an access lock state in which an authorization processing is denied by anyone) when authorization processing errors occurs continually, thereby to disenable new authorization processing.

Here, "lock" or "access lock" section control of access to a specified file or data and control of updating thereof. Particularly, when write processing into a file or a database is performed, access and read/write of data may be temporarily limited in order to keep consistency of data.

However, in order to release generally the lock, it is necessary to perform once an OFF/ON operation for a power source of the device. When the device does not exist near the administrator, the administrator must go to the device to perform the operation, so that there is a problem that much labor is required and convenience is low.

Though it is convenient that the lock may be released by the remote operation also in such the state, it is difficult to distinguish between an unauthorized user and a registered user through a communication network, and it is thought that there is fear of spoofing. Therefore, there is a difficult problem that it is difficult to provide exactly an effective release method for the registered user.

SUMMARY

According to an aspect of the invention, an information processing device includes a lock section, a creation section, a communication section, a transmission section, a reception section, a search section, a judgment section, and a release section. The lock section disables an authorization processing function of the information processing device under a given condition. The creation section creates a first lock release file so that enabling the authorization processing function. The communication section connects to a information management device. The transmission section transmits the first lock release file created by the creation section through the communication section to the information management device. The reception section receives through the communication section, a second lock release file which is transmitted as a reply from the information management device based on the first lock release file. The search section obtains first communication route information indicating a communication route from the information processing device to the information management device. The judgment section judges whether the second lock release file is valid or not. The release section tries the release of the locked function when the second lock release file is judged to be valid by the judgment section. The second lock release file includes information relating to the information management device. The information relating to the information management device includes second communication route information. The judgment section checks the communication route information and the second communication route information. The judgment section, when the second communication route information corresponds to the first communication route information and indicates a communication route from the information management device to the information processing device, judges the second lock release file to be valid.

BRIEF DESCRIPTION OF THE DRAWINGS

Exemplary embodiments of the present invention will be described in detail based on the following figures, wherein.

DETAILED DESCRIPTION

Embodiments as examples of the invention will be described in detail with reference to drawings. Here, in the accompanying drawings, the same members are denoted by the same reference characters, and the overlapped description is omitted. Further, herein, the description is a best mode for carrying out the invention, and the invention is not limited to the mode.

First Exemplary Embodiment

Figure 1:
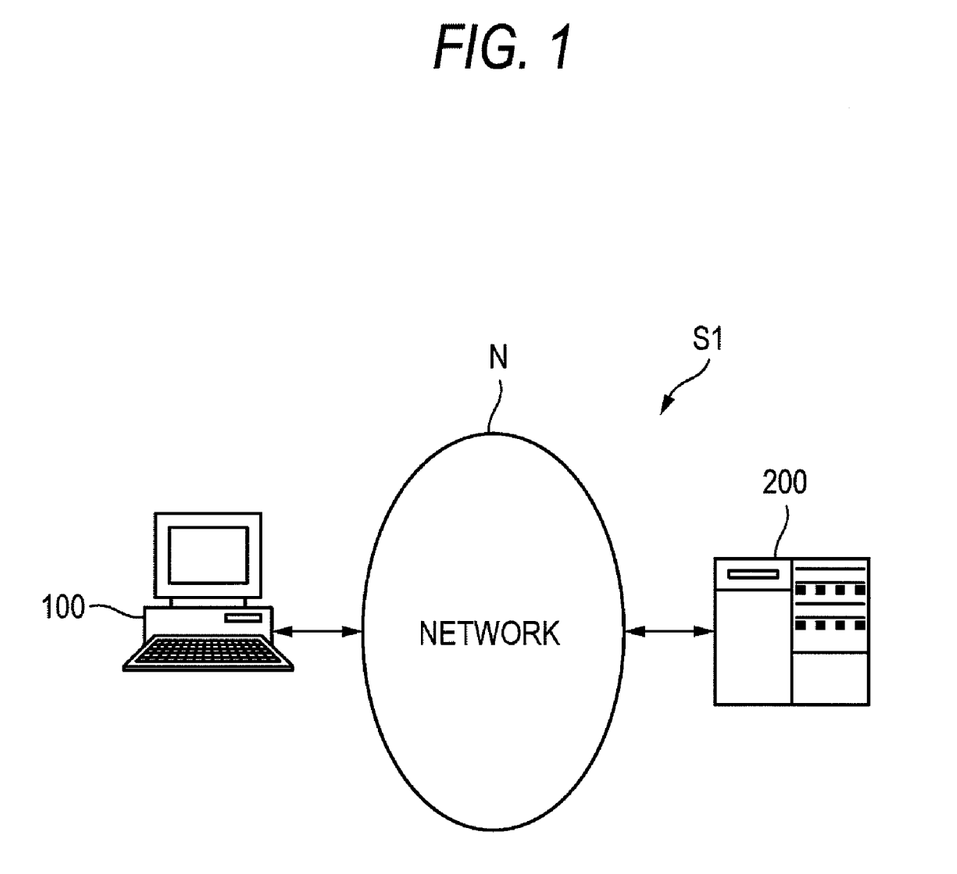
FIG. 1 is a constitutional diagram showing an outline of an information processing system according to a first exemplary embodiment.

With reference to a constitutional diagram in FIG. 1 and a block diagram in FIG. 2, the configuration of an information processing system S1 according to a first exemplary embodiment of the invention will be described.

The information processing system S1 includes an information processing device (device: personal computer or printer having a network function) 100 to be connected to a network N such as LAN, and an information management device 200 which manages information of the information processing device 100. Although a case where one information processing device 100 is connected to the network N is shown in FIGS. 1 and 2, the invention may be applied also to a case where plural information processing devices 100 are connected to the network N.

Figure 2:
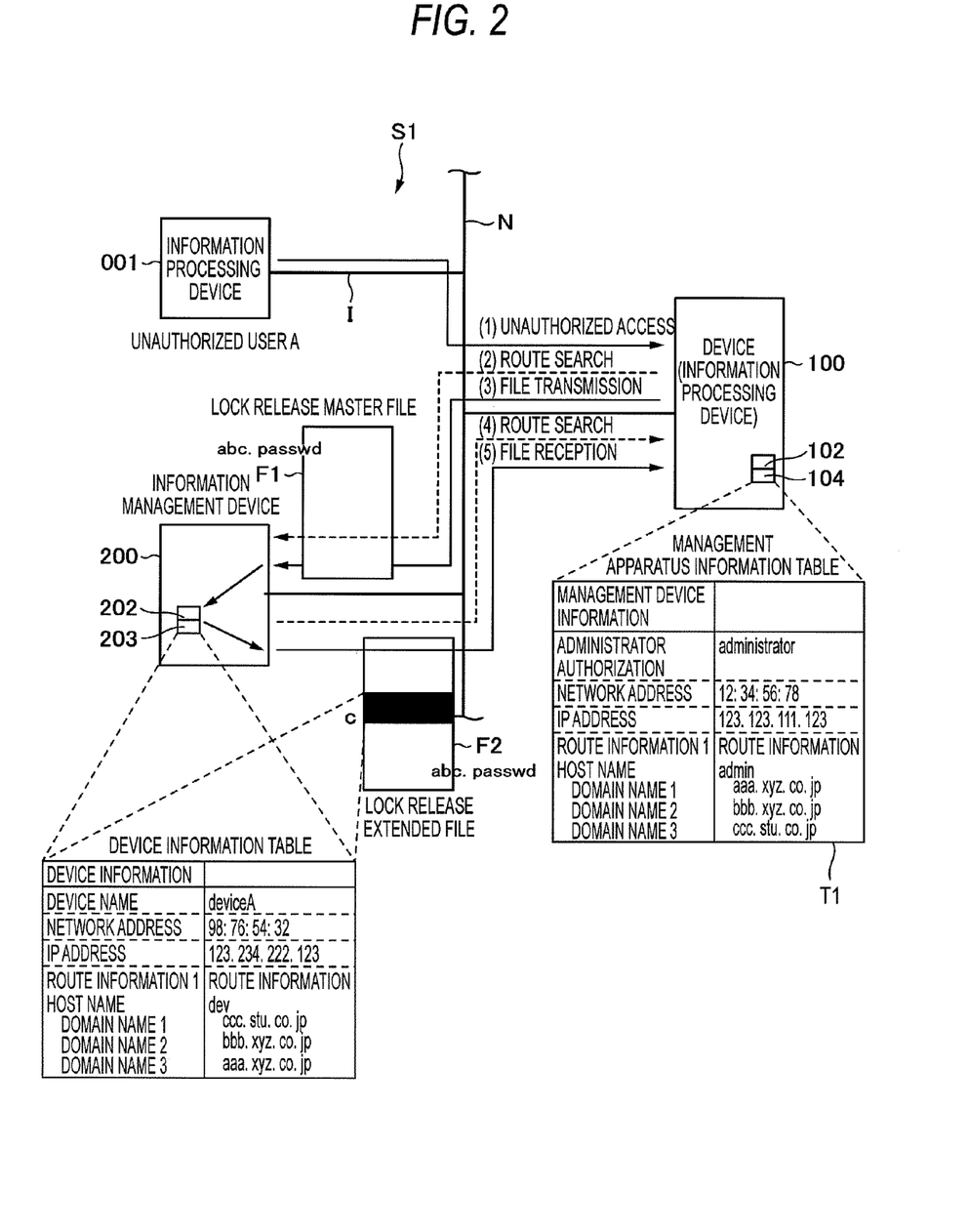
FIG. 2 is a block diagram showing the configuration and functions of the information processing system according to the first exemplary embodiment.

Further, an information processing device (personal computer) 001 shown in FIG. 2 indicates a device which performs connection from the outside through an Internet I to which the network N is connected. In this exemplary embodiment, it is assumed that unauthorized access to the information processing device 100 is executed by an unauthorized user A who operates the information processing device 001.

Here, the unauthorized access generally means that: a person who has no authorized access right for an information processing device (computer) acquires the access right by maliciously using a disadvantage of software, and uses the computer illegally or attempts an unauthorized entry.

As the typical unauthorized access, a malicious user may see a file or delete or alter a file by using a weak point in the security of the software (security hole), or by extracting a password by interception or brute force attack, and maliciously distribute junk mails by using a mail server and the extracted password.

For example, when a person in habit of gaining the unauthorized access, called a hacker succeeds in entry to a computer, he sets up backdoor or worm, thereby frequently entering another computer through its computer or attempting access interference attack (DDoS (Distributed Denial of Service) attack). This is a social problem.

The damage due to the unauthorized access is rapidly increasing with the spread of the Internet. Therefore, in Japan, Anti-Unauthorized Access Law was made in 1999 to punish the hacker for these unauthorized access acts as criminal acts.

Further, "spoofing" as a means of gaining the unauthorized access means the whole of acts on network using a name or an ID of another person. Generally, it means an act of deceiving an authentication system by maliciously using an using ID and a password to enter an objective internal system.

A person which has made the "spoofing" act is the subject to be punished because he has infringed the Anti-Unauthorized Access Law under the necessary condition where he exceeds an access control function using an "identification code of another person" established by the Anti-Unauthorized Access Law.

The information processing device 100, when it has detected the unauthorized access by the unauthorized user A, shifts to an access lock state (lock state) in which an authorization processing is denied by anyone. This access lock state is, as described later, released only when it is authenticated that a lock release extended file (second lock release file) sent from the information management device 200 is valid.

Next, the configuration of the information processing device 100 will be described with reference to a block diagram in FIG. 3.

Figure 3:
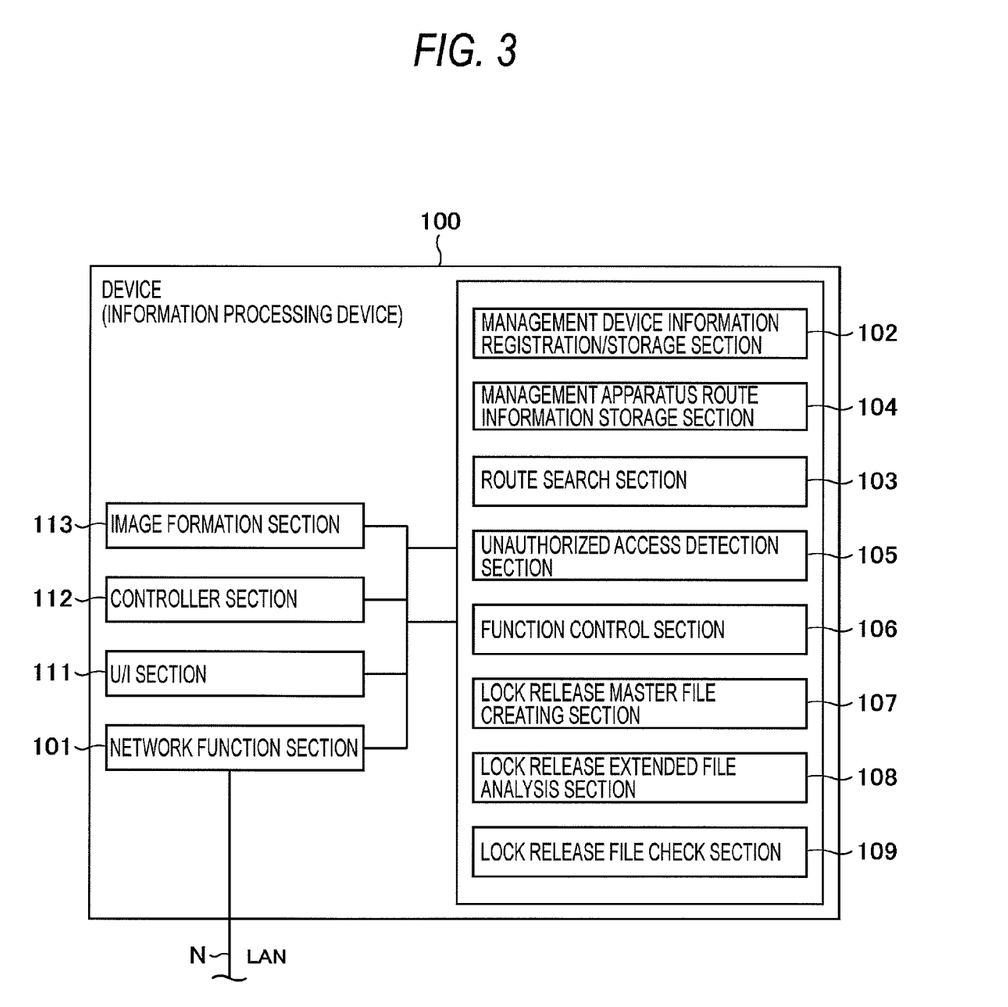
FIG. 3 is a block diagram showing the configuration of an information processing device (device)

As shown in FIG. 3, the information processing device 100 includes: a network function section 101 which connects to a network N such as LAN; a management device information registration/storage section 102 which registers information relating to the information management device 200; a route search section 103 which searches a route to the information management device 200; a management device route information storage section 104 that stores the route information to the information management device 200 which has been searched by this route search section 103; an unauthorized access detection section 105 which detects the existence of unauthorized access; a function control section 106 which is constituted by such as a microcomputer and performs control of each section; a lock release master file creating section 107 that generates a lock release master file (first lock release file); a lock release extended file analysis section 108 which analyzes a lock release extended file (second lock release file) sent as a reply from the information management device 200; a lock release file check section 109 which checks various pieces of information based on the lock release extended file; an image formation section 113 which forms a displaying image or a printing image; a controller section 112 which controls various functions; and an user interface (such as a control panel) 111 which performs various inputs.

In the management device information registration/storage section 102 and the management device route information storage section 104, as shown in FIG. 2, as a management device information table T1, there are stored information such as administrator authorization: "administrator", network address: "12:34:56:78", IP address: "123.123.111.123", and route information (host name: "admin", domain name 1: "aaa.xyz.co.jp", domain name 2: "bbb.xyz.co.jp", and domain name 3: "ccc.stu.co.jp").

Further, the lock release master file F1 created by the lock release master file creating section 107, as shown in FIG. 2, includes at least a password such as "abc". Further, when a one time password is used as this password, security may be further enhanced.

Here, the one time password (OPT) is one of authentication technologies for verifying, in the time of using a server computer through a network from a remote terminal (in remote access), whether or not a person who gains access is a registered user. A usual authentication method of transmitting a user name and a corresponding password has such a weak point that there is possibility that the password may be intercepted on a communication route from the terminal to the server. Therefore, in the one time password, first, the server transmits a random character string (referred to as "challenge") used as the "kind" of authentication string to the terminal. The user inputs a secret password which only he knows in the terminal. The software provided in the terminal operates the challenge character string sent from the server and the password inputted by the user in accordance with a given procedure, and transmits the obtained result (referred to as "response") to the server. The server verifies the transmitted character string and checks whether the user is a registered user. The challenge is set so as to become different character string every time, and also the password inputted by the user is transmitted to the server as the different character string every time. Therefore, if communication between the server and the terminal is intercepted on the communication route, since the same password cannot be used again, the server is not used illegally. As software for realizing the one-time password, there are S/KEY and OPE which are free software, and SecurID by Security Dynamics Technologies Inc.

A method of searching a route by the route search section 103 is not particularly limited. The route search may be performed using an OS standard route search program or a program unique to the device, for example, "trace route" in case that OS (Operating System) is Linux, and "ping/tracert" in case that OS is Windows (trademark by Microsoft Corporation).

From this route information, information of a network (domain) to which the information management device 200 belongs, and router (gateway) information are determined; and from the IP address of the information management device 200, a logical position on the network is determined.

Figure 4:
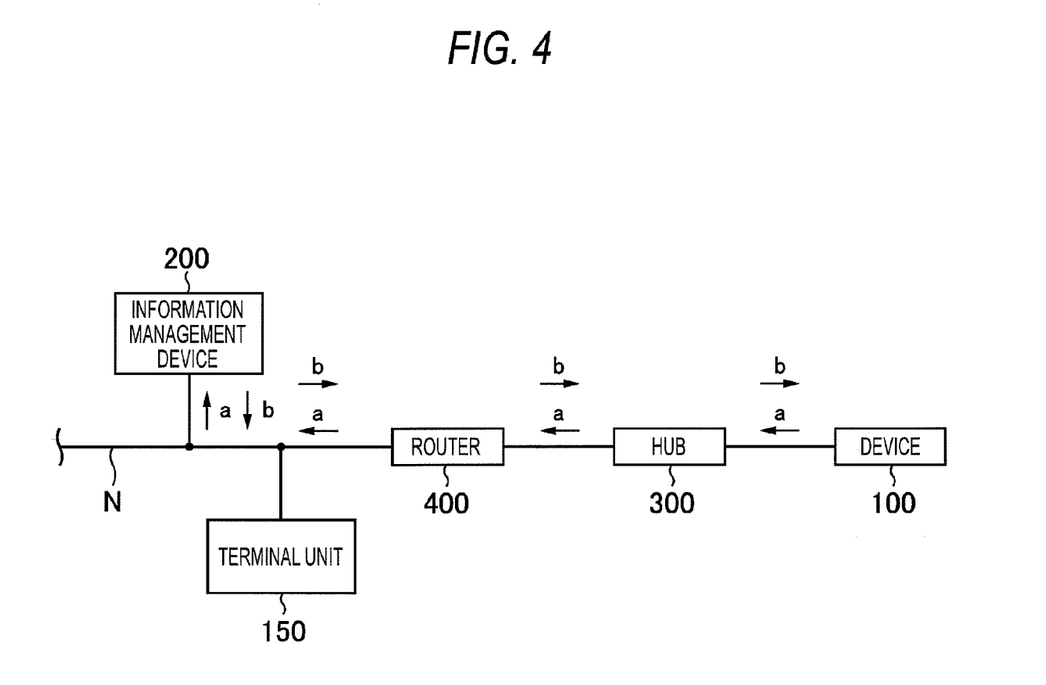
FIG. 4 is an explanatory view showing an example of route search between the information processing device (device) and an information management device.

Namely, as shown in FIG. 4, actually, between the information processing device 100 and the information management device 200, various network devices such as a hub 300 and a router 400 are interposed, various information are collected in order of passing their network devices in a direction of an arrow a, and the collected information are registered as route information.

Further, information registered in a management device information table storing section 110 are not limited to the above case, but may include at least one of administrator's name, network address, IP address, a host name, total hop count, communication route information, a domain name, domain IP address, and internode communication time.

Here, the hop count means the number of nodes from the information processing device 100 through the router to the objective information management device 200.

Further, the internode communication time section communication time means communication time between the nodes such as the hub 300 and the router 400 which constitute the network.

Next, the configuration of the information management device 200 will be described with reference to a block diagram in FIG. 5.

Figure 5:
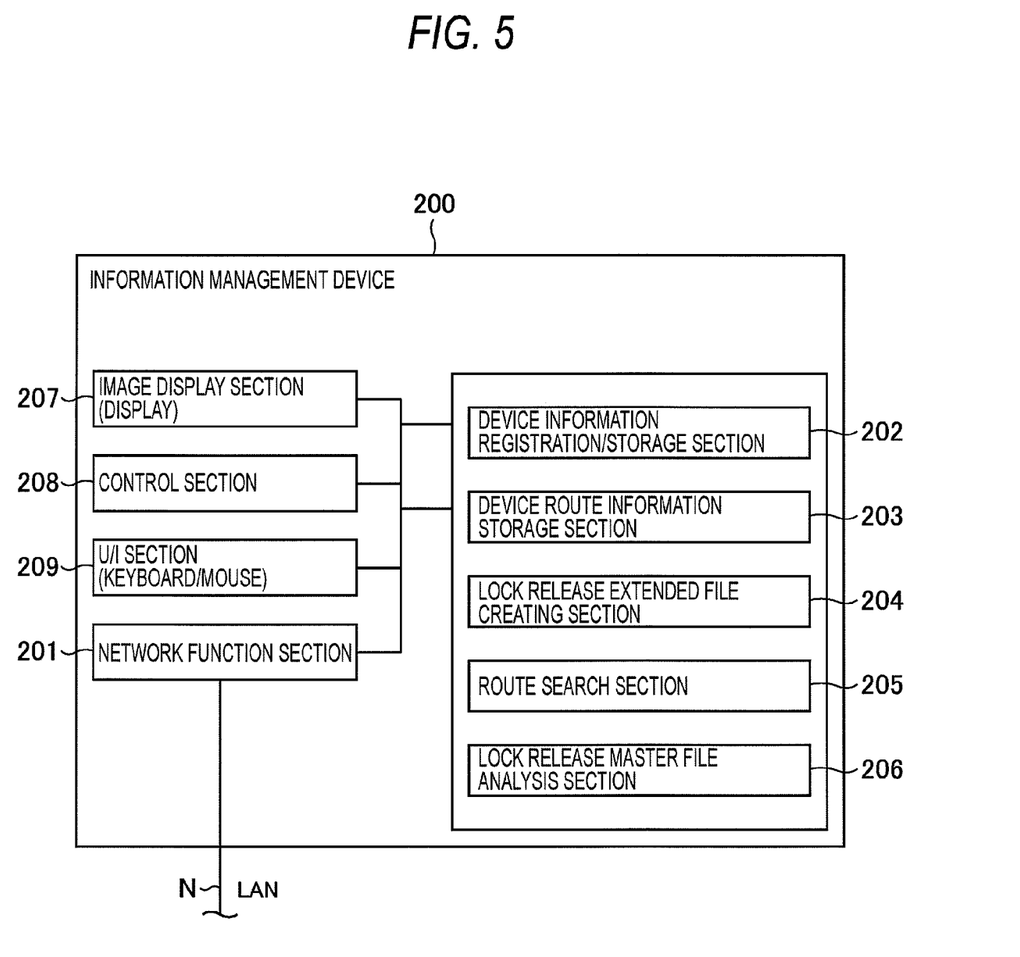
FIG. 5 is a block diagram showing the constitution of the information management device.

As shown in FIG. 5, the information management device 200 includes a network function section 201 which connects to a network N such as LAN; a device information registration/storage section 202 which stores information of the information processing device 100; a device route information storage section 203; a lock release extended file creating section 204 which creates a lock release extended file (second lock release file); a route search section 205 which searches a communication route to the information processing device 100; a lock release master file analysis section 206 which analyzes a lock release master file F1 sent from the information processing device 100; an image display section 207 which includes a liquid crystal display and displays various information thereon; a control section 208 which controls each section; and a user interface section 209 which has a keyboard and a mouse, and performs input of various information.

In the device information registration/storage section 202 and the device route information storage section 203, as shown in FIG. 2, as a device information table T2, there are stored information such as a device name: "device A", network address: "98:76:54:32", IP address: "123.234.222.123", and route information (host name: "dev", domain name 1: "ccc.stu.co.jp", domain name 2: "bbb.xyz.co.jp", and domain name 3: "aaa.xyz.co.jp").

A method of searching a route by the route search section 205 is not particularly limited. Similarly to the method by the route search section 103 of the information processing device 100, the route search may be performed using an OS standard route search program or a program unique to the device.

From this route information, information of a network (domain) to which the device (information processing device) 100 belongs, and router (gateway) information are determined; and from the IP address of the device (information processing device) 100, a logical position on the network is determined.

Namely, as shown before in FIG. 4, actually, between the information processing device 100 and the information management device 200, various network devices such as the hub 300 and the router 400 are interposed, various information are collected in order of passing their network devices in a direction of an arrow b, and the collected information are registered as route information.

Further, information registered in the device information registration/storage section 202 and the device route information storage section 203 are not limited to the above case, but may include at least one of a device name, network address, IP address, a host name, total hop count, communication route information, a domain name, domain IP address, and internode communication time.

Further, the lock release extended file F2 created by the lock release extended file creating section 204, as shown in FIG. 2, includes, in addition to a password (for example, "abc"), data of the device information table T2 in a given area C.

Hereby, the lock release extended file F2 is transmitted as a reply to the information processing device 100, and the data of the device information table T2 included in the lock release extended file F2 are checked on the information processing device 100 side. In result, the illegal act such as spoofing may be effectively prevented, and the access lock state of the information processing device 100 may be released in a safety state.

Figure 6:
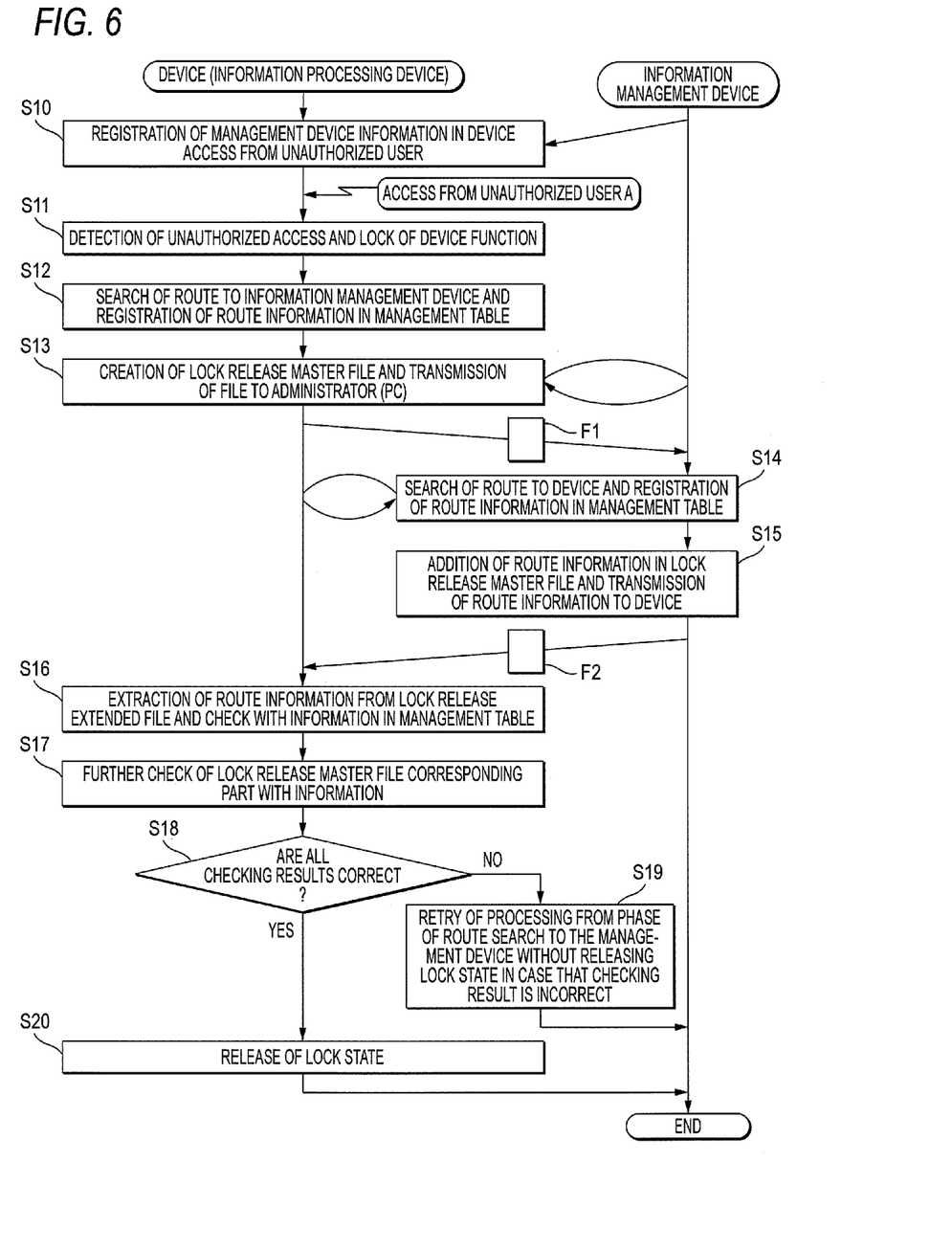
FIG. 6 is a flowchart showing the operation of the information processing system according to the first exemplary embodiment.

Next, with reference to a flowchart in FIG. 6, the operation of the information processing system S1 having the above configuration will be described.

First, in the information processing device 100, in a step S10, by a remote operation from the information management device 200 through the network N, information on the information management device 200 is registered in the management device information registration/storage section 102 and the management device route information storage section 104 of the information processing device 100.

Further, from the user interface section 111 of the information processing device 100, the information relating to the information management device 200 may be inputted manually.

When an unauthorized access to the authentication information of the device (information processing device) 100 from the information processing device 001 of the unauthorized user A is executed, the information processing device 100 detects the unauthorized access from the unauthorized user A by section of the unauthorized access detecting section 105, and shifts to a lock (access lock) state where the functions of the information processing device 100 are locked so as to be unusable (step S11).

Next, the operation proceeds to a step S12. The information processing device 100 performs route search for the information management device 200 which has been previously registered therein. From this route information, information of a network (domain) to which the information management device 200 belongs, and router (gateway) information are determined. And from IP address of the information management device 200, a logical position on the network is determined.

Next, the information processing device 100 stores the above route information in the management device information table T1 inside the information processing device 100, and then the operation proceeds to a step S13.

Figure 7:
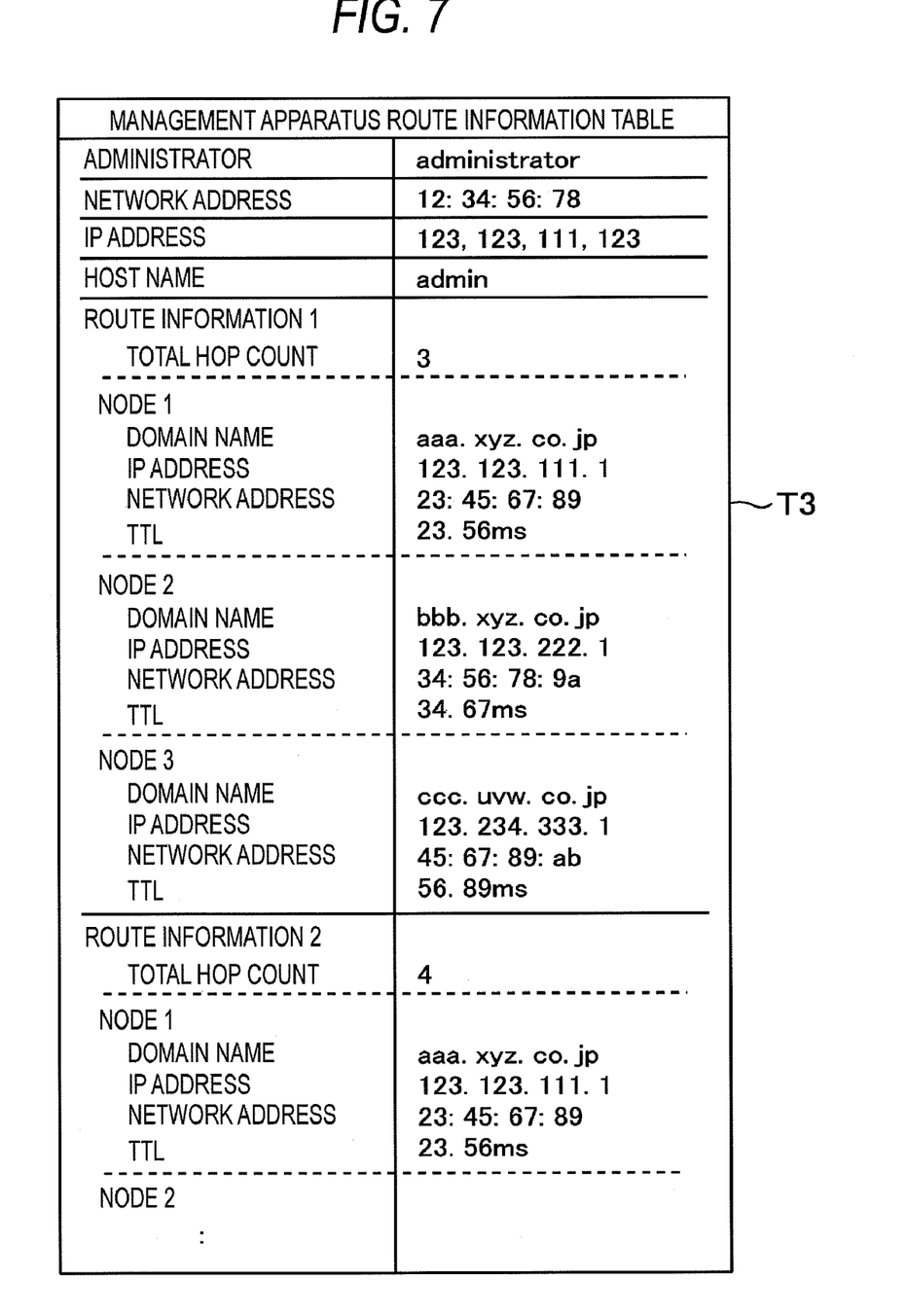
FIG. 7 is an explanatory view showing a constitutional example of a management device route information table.

Separately from the management device information table T1, a management device information table T3 as shown in FIG. 7 may be prepared to store the above route information.

In the management device information table T3 shown in FIG. 7, there are stored more detailed route information (for example, total hop count and internode communication time (TTL)) than the route information in the management device information table T1 shown in FIG. 2. In case that the detailed route information such as the management device information table T3 is used, stricter authentication may be performed.

In a step S13, the information processing device 100 creates a lock release master file (first lock release file) F1 (refer to FIG. 2) by the lock release master file creating section 107, and transmits the lock release master file F1 to the information management device 200 through the network N.

Here, when the lock release master file F1 is transmitted, in order to prevent the lock release master file F1 from being transmitted, over the extra and unnecessary router other than the domain to which the information management device 200 belongs, to another network and from leaking to the illegally accessing person through the network having no domain to which the administrator belongs, the hop count to the information management device 200, which is confirmed by the route search, may be limited to transmit the lock release master file F1. For example, in case that there are two routers 400 (refer to FIG. 4) to the information management device 200 from the information processing device 100, processing of limiting the hop count to two is performed.

Next, in a step S14 and a step S15, the information management device 200, on the reception of the lock release master file F1, performs the route search to the information processing device 100 which performs the lock release. The obtained route information is stored in the device route information storage section 203, and simultaneously, the data of the device information table T2 is stored in a previously determined area C in the lock release master file F1 thereby to create a lock release extended file (second lock release file) F2.

Further, the data format of the lock release extended file F2 may be a format in which a text may be recognized as it is. However, by making the data format into an encryption/compressed format or into a coding format in which data may be browsed only by the specified software, security may be further improved.

Next, this lock release extended file F2 is transmitted as a reply to the information processing device 100 through the network N.

Next, in a step S16 and a step S17, the information processing device 100 analyzes the received lock release extended file F2 by the lock release extended file analysis section 108 to extract the necessary information, and checks the route information such as the domain information, the device information, and the password which are included in the lock release extended file F2 with the route information to the information management device 200, the device information, and the password which have been previously stored, thereby to perform authentication of legitimacy of the transmitter.

In case that the check results of all the information are judged to be correct in a step S18, the operation proceeds to a step S20, and the lock state of the predetermined function of the information processing device 100 is released to end the processing.

On the other hand, in case that the check result of any information is judged to be incorrect in the step S18, the operation proceeds to a step S19, where the route search to the information management device 200 is executed again and the processing ends without releasing the lock state.

Hereby, the illegal act such as spoofing is prevented without adding another device and at a low cost, so that an excellent advantage that the security may be improved may be obtained.

Second Exemplary Embodiment

Figure 8:
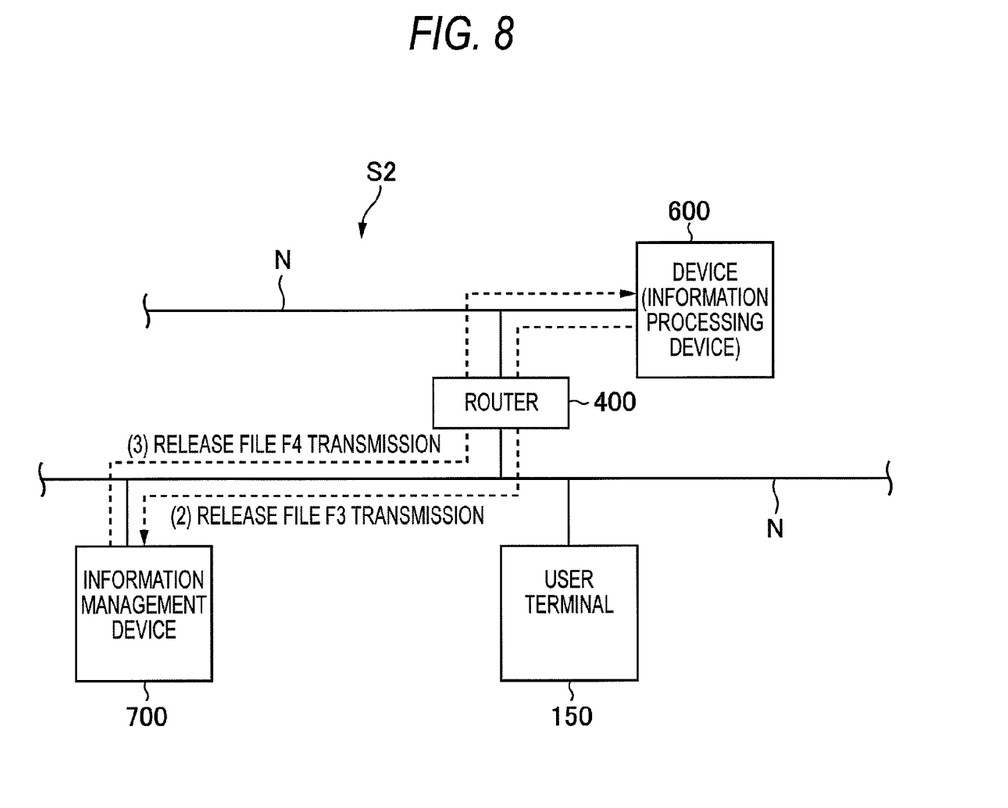
FIG. 8 is a block diagram showing the configuration of an information processing system according to a second exemplary embodiment.

Next, with reference to a block diagram in FIG. 8, the configuration of an information processing system S2 according to a second exemplary embodiment of the invention will be described.

Basically, the configuration of the information processing system S2 is similar to the configuration of the information processing system S1 according to the first exemplary embodiment, in which a device 600 (information processing device: personal computer or a printer having a network function) and an information management device 700 are connected through a network N such as LAN. In an example shown in FIG. 8, a router 400 is interposed between the device 600 and the information management device 700.

Here, with reference to a block diagram in FIG. 9, the configuration of the device 600 will be described.

Figure 9:
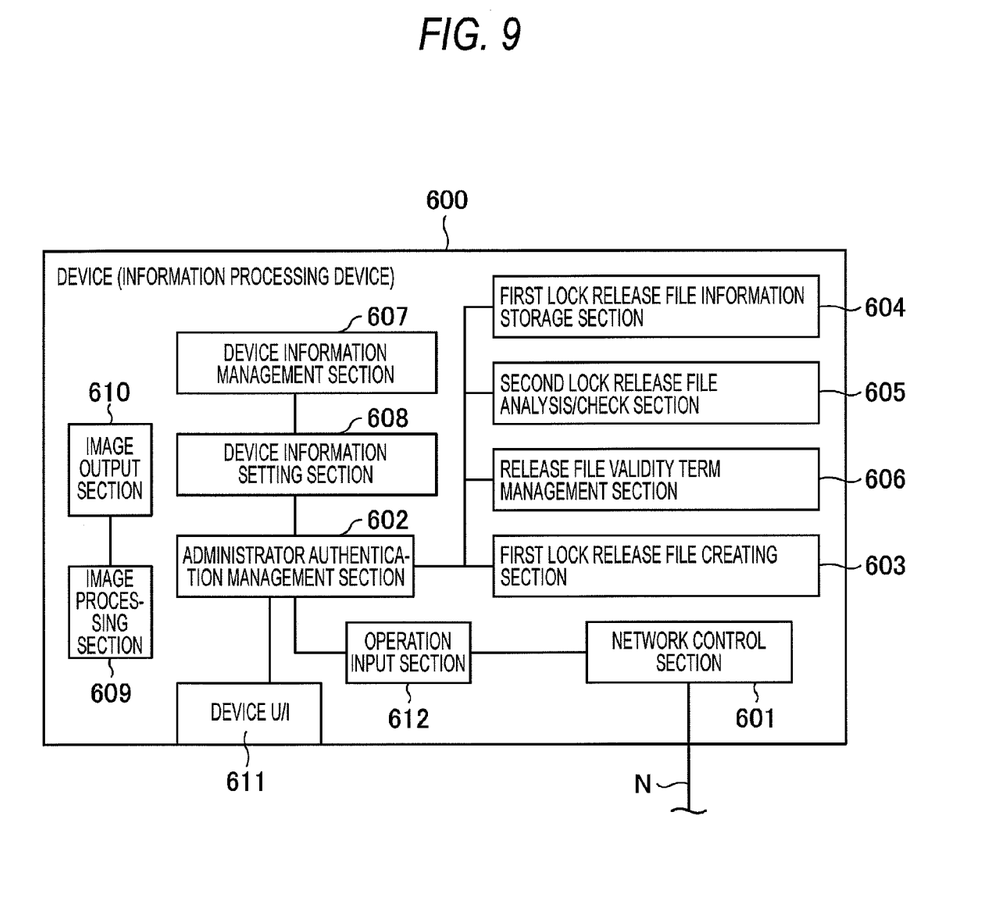
FIG. 9 is a block diagram showing the constitution of an information processing device (device)

As shown in FIG. 9, the device 600 includes a network control section 601 which connects to a network N such as LAN; an administrator authentication management section 602 which performs authentication of an administrator of the information management device 700; a first lock release file creating section 603 which creates a first lock release file F3; a first lock release file information storage section 604 which stores the created first lock release file F3; a second lock release file analysis/check section 605 which analyzes and checks a second lock release file F4 to be transmitted as a reply from the information management device 700; a release file validity term management section 606 which manages a validity term of the first lock release file F3; a device information management section 607 which manages information relating to the device 600; a device information setting section 608 which sets device information; an image processing section 609 which forms a displaying image or a printing image; an image output section which outs image information; a user interface section 611 which includes a display panel; and an operation input section 612 which includes a keyboard.

Further, in place of or in addition to the operation input section 612, an input section which may perform remote input from a web server may be provided.

Next, with reference to block diagram in FIG. 10, the configuration of the information management device 700 will be described.

Figure 10:
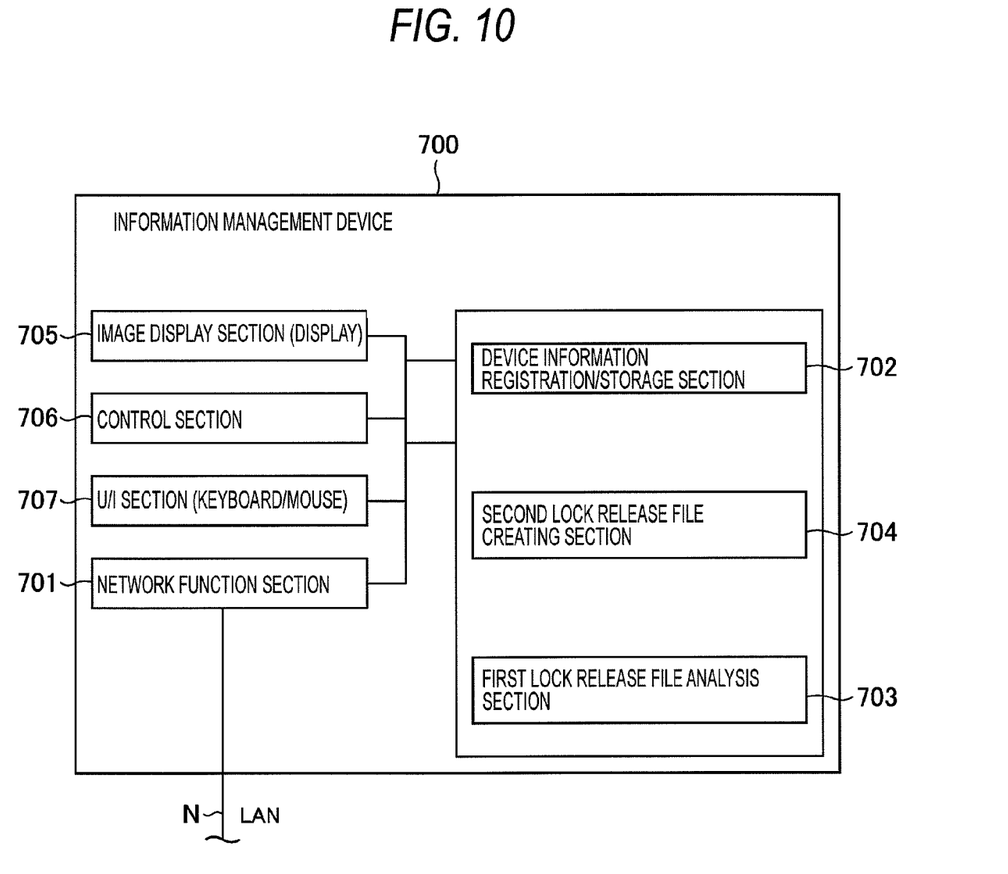
FIG. 10 is a block diagram showing the constitution of an information management device.

As shown in FIG. 10, the information management device 700 includes a network function section 701 which connects to a network N such as LAN; a device information registration/storage section 702 which registers and stores information of the device 600 therein; a first lock release file analysis section 703 which analyzes the first lock release file F3 transmitted from the device 600; a second lock release file information creating section 704 which creates a second lock release file information F4 based on the first lock release file F3; an image display section 705 which includes a liquid crystal display and displays various information; a control section 706 which controls each section; and a user interface section 707 which includes a key board and a mouse.

Figure 11:
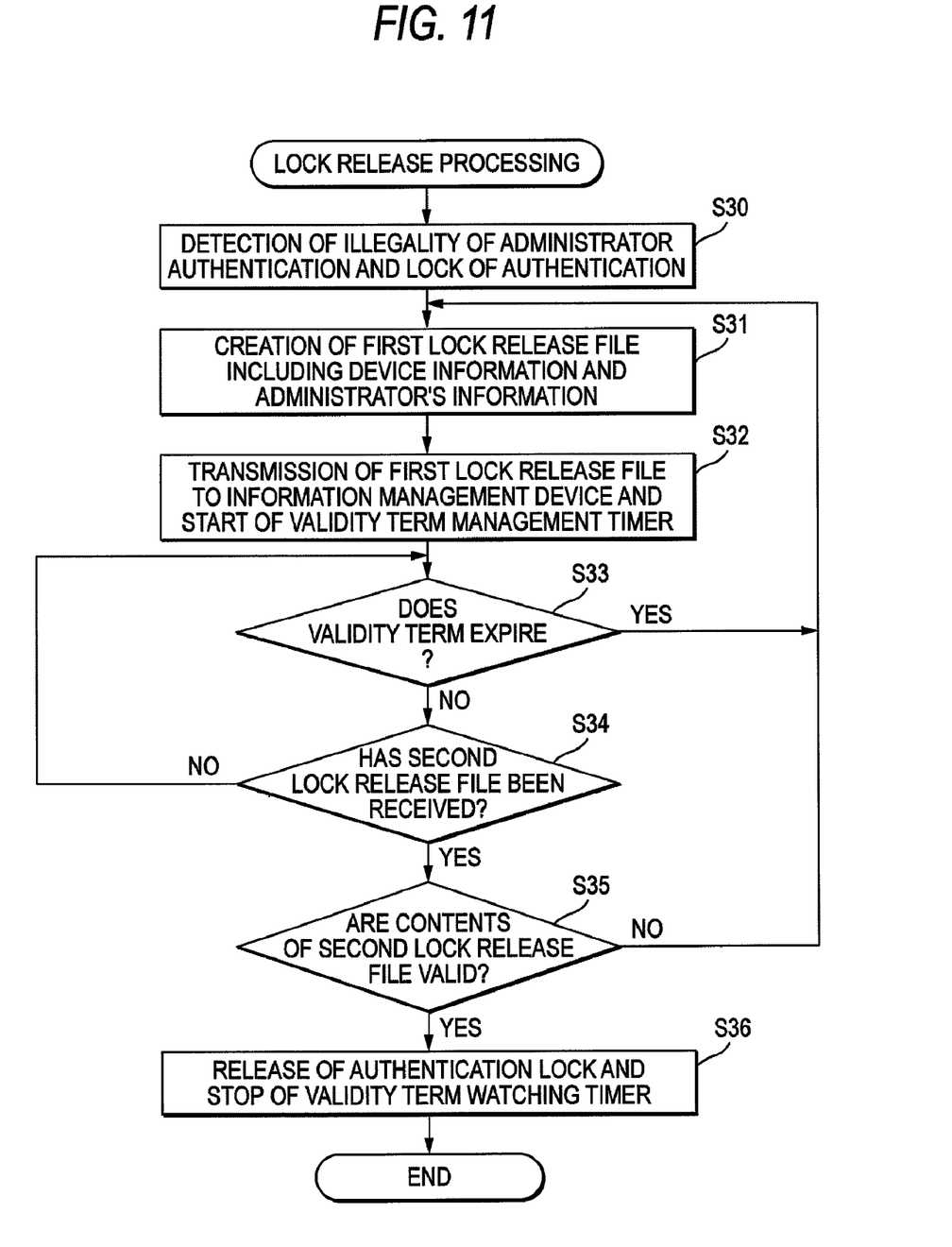
FIG. 11 is a flowchart showing a procedure of lock release processing executed by the information processing system according to the second exemplary embodiment.

Here, with reference to a flowchart in FIG. 11, a procedure of lock release processing executed by the information processing system S2 having the above configuration will be described.

When this processing starts, first, in a step S30, the device 600 detects an illegality of administrator's authentication with the unauthorized access by the unauthorized user, and shifts to an authentication lock (or access lock) state in which authentication is not accepted.

Next, in a step S31, the first lock release file creating section 603 creates a first lock release file F3 including device information and administrator information.

Here, the configuration example of the first lock release file F3 will be described with reference to FIG. 12A.

Figure 12A:
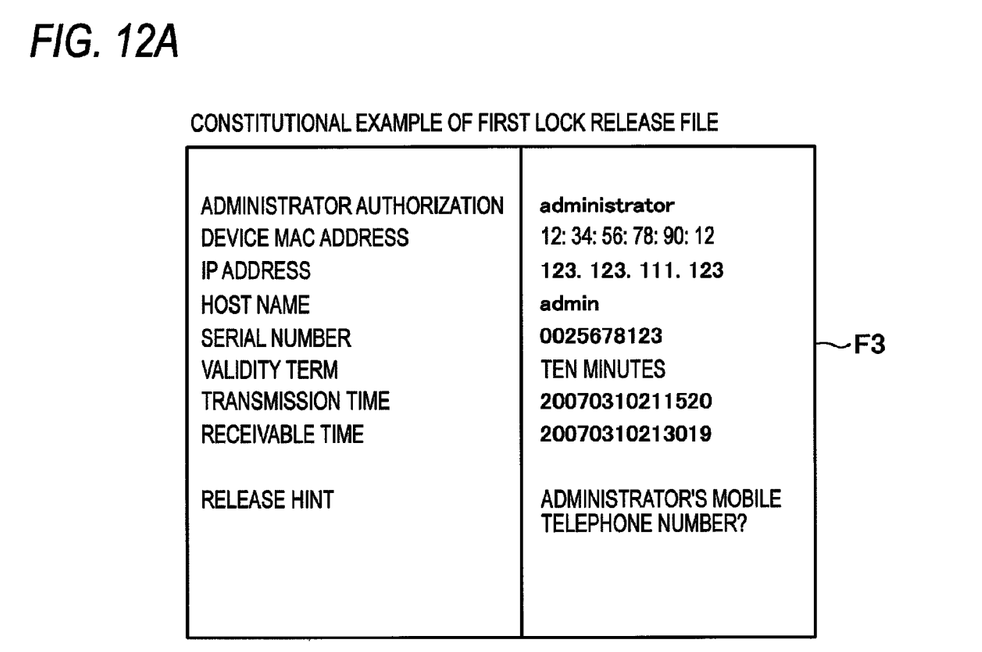
FIG. 12 is an explanatory view showing constitutional examples of a first lock release file and a second lock release file which are applied to the information processing system according to the second exemplary embodiment.

In the example in FIG. 12A, administrator authorization: "administrator", device MAC address: "12:34:56:78:90:12", IP address: "123.123.111.123", a host name: "admin", serial number: "0025678123", a validity term: 10 min. (This may be arbitrarily set.), transmission time, and ready time for receiving are stored in the file F3, which are not particularly limited.

Further, in the example in FIG. 12A, as an inquiry (release hint) on an item which the administrator may know, "administrator's mobile telephone number" is inquired thereby to prevent spoofing as much as possible.

As long as this release hint is the inquiry on the item which the administrator may know, any inquiry may be used. Further, when the release hint is changed every time the first lock release file F3 is created, the security may be further heightened.

Next, the processing proceeds to a step S32. Simultaneously with transmission of the first lock release file F3 to the information management device 700, a management timer of the validity term is started and the processing proceeds to a step S33.

In a step S33, whether the validity term expires is judged. In case that a result of the judgment is "Yes", the result section that the counted time passes the validity term. The processing returns to the step S31 and the similar processing is performed.

On the other, when the result of the judgment is "No", the processing proceeds to a step S34, and whether the second lock release file F4 created by the information management device 700 has been received is judged.

Here, a configuration example of the second lock release file F4 will be described with reference to FIG. 12B.

Figure 12B:
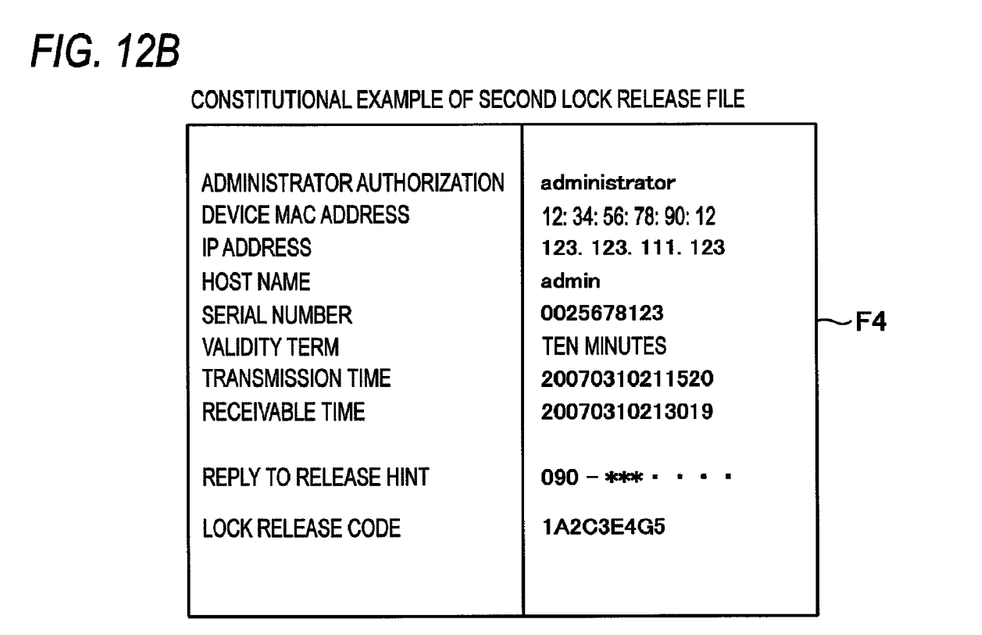

In the example in FIG. 12B, administrator authorization: "administrator", device MAC address: "12:34:56:78:90:12", IP address: "123.123.111.123", a host name: "admin", serial number: "0025678123", a validity term: 10 min. (This can be arbitrarily set.), transmission time, and ready time for receiving are stored in the file F4, which are not particularly limited.

Further, a reply to the above release hint is made, and administrator's mobile telephone number is stored in the file F4. In this case, the reply to the release hint may be input manually by the administrator himself from the user interface section 707 of the information management device 700, or the reply is previously stored in a predetermined storing section in the information management device 700 and may be inputted automatically. Hereby, it is possible to prevent spoofing onto the administrator as much as possible.

Then, in case that a result of the judgment in the step S34 is "No", the processing returns to the step S33; and in case that a result of the judgment is "Yes", the processing proceeds to a step S35.

In the step S35, the received second lock release file F4 is analyzed, and whether or not its contents are valid, that is, whether or not the device information and the route information in the file F4 coincide with those in the file F3, or whether or not the reply to the release hint is correct is judged.

In case that a result of the judgment is "No", since the second lock release file F4 may be the illegal file, the processing returns to the step S31 and the similar processing is performed.

On the other hand, in case that a result of judgment in is "Yes", the second lock release file F4 is judged to be valid, so that the authentication lock state is released on the basis of a lock release code, and the validity term watching timer is stopped to end the processing.

Thus, by setting the validity term in the first lock release file F3, probability of file leakage is reduced, so that the security may be improved.

Further, by adding the inquiry (release hint) on the item which the administrator may know in the first lock release file F3, and inputting the reply to the inquiry in the second lock release file F4, it is possible to prevent spoofing onto the administrator, so that the security can be further improved.

Although the invention made by the inventor has been concretely described above with reference to the embodiments, it is to be understood that the embodiments disclosed in this specification are illustrative in all points and not limited to the disclosed technology. Namely, the technical scope of the invention should not be interpreted restrictively on the basis of the description of the aforesaid embodiments, but should be strictly interpreted in accordance with the description of the claims, and includes technology equivalent to the technology described in the claims and all changes within the claims.

Further, when a program is used, it may be provided through a network, or provided in a storage state in a recording medium such as CD-ROM.

The information processing device, the information management device, the information processing system, the information processing program, and the information management program according to the invention may be applied to a personal computer, a laser printer having a network function, a full-color printer, and a facsimile apparatus.

What is claimed is:

1. An information processing device including a microcomputer, the information processing device comprising:
a lock section that disables an authorization processing function of the information processing device under a given condition;
a creation section that creates a first lock release file that is configured to enable the authorization processing function disabled by the lock section;
a communication section that connects to a information management device;
a transmission section that transmits the first lock release file created by the creation section through the communication section to the information management device;
a reception section that receives through the communication section, a second lock release file which is transmitted as a reply from the information management device based on the first lock release file;
a search section that, using the microcomputer, obtains first communication route information indicating a communication route from the information processing device to the information management device,
a judgment section that, using the microcomputer, determines whether the second lock release file is valid by determining whether the second file is transmitted from the information management device; and a release section that enables the authorization processing function disabled by the lock section when the second lock release file is determined to be valid by the judgment section, wherein the second lock release file includes information relating to the information management device, the information relating to the information management device includes second communication route information, the judgment section checks the first communication route information and the second communication route information, and the judgment section, when the second communication route information corresponds to the first communication route information and indicates a communication route from the information management device to the information processing device, determines the second lock release file to be valid.

2. The information processing device according to claim 1, further comprising:

a registration section that registers previously the information relating to the information management device, wherein the judgment section, when the information relating to the information management device included in the second lock release file corresponds to the information on the information management device registered in the registration section, determines the second lock release file to be valid.

3. The information processing device according to claim 1, wherein the information relating to the information management device further includes at least one of an administrator name, a network address, an IP address, a host name, a total hop count, a domain name, a domain IP address, and an internode communication time.

4. The information processing device according to claim 1, further comprising:

a term setting section that sets a validity term and adds the validity term to the first lock release file.

5. The information processing device according to claim 4, wherein the judgment section, when the receiving section receives the second lock release file within the validity term, determines the second lock release file to be valid.

6. The information processing device according to claim 4, further comprising:

a resending section that resends, when the receiving section does not receive the second lock release file within the validity term set in the first lock release file, a first lock release file newly created by the creation section to the information management device.

7. The information processing device according to claim 1, further comprising:

a password addition section that adds a one-time password to the first lock release file, wherein the judgment section, when a password included in the second lock release file transmitted as a reply from the information management device is valid, determines the second lock release file to be valid.

8. The information processing device according to claim 1, further comprising:

an inquiry addition section that adds an inquiry to the first lock release file, wherein the judgment section, when a reply (i) corresponding to the inquiry and (ii) included in the second lock release file transmitted as a reply from the information management device, is valid, determines the second lock release file to be valid.

9. An information processing system comprising:

at least one information processing device, the information processing device including a microcomputer; and at least one information management device, wherein each information processing device comprises:

a lock section that disables an authorization processing function of the information processing device under a given condition;

a creation section that creates a first lock release file that is configured to enable the authorization processing function disabled by the lock section;

a communication section that connects to the at least one information management device;

a transmission section that transmits the first lock release file created by the creation section through the communication section to the at least one information management device;

a reception section that receives through the communication section, a second lock release file which is transmitted as a reply from the at least one information management device based on the first lock release file;

a search section that, using the microcomputer, obtains a first communication route information indicating a communication route from the information processing device to the information management device, a judgment section that, using the microcomputer, determines whether the second lock release file is valid; and a release section that enables the authorization processing function when the second lock release file is determined to be valid by the judgment section, wherein the second lock release file includes information relating to the information management device, the information relating to the information management device includes second communication route information, the judgment section checks the second communication route information against the first communication route information, and the judgment section, when the second communication route information corresponds to the first communication route information and indicates a communication route from the information management device to the information processing device, determines the second lock release file to be valid, and wherein each information management device comprises:

a communication section that connects to the at least one information processing device;

a reception section that receives the first lock release file through the communication section;

a creation section that creates a second lock release file based on the first lock release file; and a reply section that transmits the second lock release file as the reply to the information processing device through the communication section.

10. A method comprising:

disabling an authorization processing function of an information processing device under a given condition;

creating a first lock release file that is configured to enable the authorization processing function disabled by a lock section;

connecting to an information management device;

transmitting the first lock release file to the information management device;

receiving, in response to transmitting the first lock release file, a second lock release file from the information management device, the second lock release file being based on the first lock release file;

obtaining first communication route information indicating a first communication route from the information processing device to the information management device, determining, using at least one microcomputer, whether the second lock release file is valid by determining whether the second file is transmitted from the information management device; and when the second lock release file is determined to be valid, enabling the authorization processing function that was disabled, wherein the second lock release file comprises information related to the management device including second communication route information, and the determining comprises checking the first communication route information and the second communication route information, and when the second communication route information corresponds to the first communication route information and indicates a communication route from the information management device to the information processing device, determining the second lock release file to be valid.

* * * * *